United States Patent [19]

Molenaar et al.

[11] 4,446,086

[45] May 1, 1984

[54] PROCESS AND APPARATUS FOR EXTRUDING STABILIZERS

[75] Inventors: Maarten Molenaar, Schoonhoven; Hermann A. Schreuder, Bilthoven, both of Netherlands

[73] Assignee: EnviroStrand, Inc., Leominster, Mass.

[21] Appl. No.: 406,048

[22] Filed: Aug. 6, 1982

[30] Foreign Application Priority Data

Oct. 30, 1981 [NL] Netherlands .......................... 8104925
May 11, 1982 [NL] Netherlands .......................... 8201928

[51] Int. Cl.³ ............................................. C09C 1/56
[52] U.S. Cl. .................................... 264/118; 264/141; 425/331; 425/DIG. 230
[58] Field of Search ...................... 425/331, DIG. 230; 264/141, 118

[56] References Cited

U.S. PATENT DOCUMENTS

| 2,902,715 | 9/1959 | Norman | 425/DIG. 230 |
| 3,129,458 | 4/1964 | Mitchell | 425/DIG. 230 |
| 3,518,723 | 7/1970 | Wooding | 425/DIG. 230 |
| 4,080,134 | 3/1978 | Klaeysen et al. | 425/DIG. 230 |

FOREIGN PATENT DOCUMENTS

205253 10/1956 United Kingdom ................ 425/331

Primary Examiner—Jay H. Woo
Attorney, Agent, or Firm—DeLio and Libert

[57] ABSTRACT

A process and apparatus for producing a dust-free blend of additives for use in plastic manufacture wherein the materials are extruded through apertures in a thin die plate supported by a strong die plate support, the apertures in the die plate being larger at their inlet ends than at their outlet ends, and apertures in the die plate support being larger than the die plate apertures, and the product being strand-like pellets of the additive materials.

20 Claims, 9 Drawing Figures

PROCESS AND APPARATUS FOR EXTRUDING STABILIZERS

The invention relates to a process for the production of a granular blend of additives for the plastic industry by mixing such additives and then processing them into shaped granules.

Such a type of process is disclosed in Dutch Patent Specification No. 134,744 describing a process for the production of dustfree blends free from plasticizing components from toxic powdery stabilizers which are not dissolvable in suited solvents. In this known process a metal free organic component which can be used as a lubricant and which is homogeneously mixable with PVC and has a melting point above 25° C. is mixed in the form of one or more metal soaps of long chain aliphatic carboxylic acids, and one or more basic lead salts of inorganic or organic acids are dispersed in the melt thus obtained and the mixture obtained is then crystalized according to a usual method. The components of the mixture are preferably chosen such that more than 10% has a melting point below 130° C. Calcium stearate and lead stearate are used as a metal soap.

Dutch Pat. No. 133,881 disclses a process for the granulation of products which are suited as processing adjuvants and additives, respectively, for plastics, especially polyvinyl chloride, in which powdery inorganic and/or metal soap stabilizers and optionally fillers, dyestuffs, antistatica or fire retarding agents are mixed, using an organic product with a long hydrocarbon chain which is solid at room temperature and is not tacky, and which has a melting or flow point of above 40° C. and a molecular weight of above 150, as a granulizer. This mixture is intensively stirred and heated above the melting point of the granulizer and subsequently cooled to room temperature whilst stirring slower. The granulizer used is preferable an ester of a fatty alcohol or a synthetic alcohol of at least 6 carbon atoms and a fatty acid, an ester or partial ester of a polyvalent alcohol and a fatty acid, a fatty alcohol or a corresponding synthetic alcohol, a fatty acid or a corresponding synthetic acid, a paraffine, a synthetic paraffine, a montan wax, a refined montan wax, a hydrogenated vegetable or animal oil, a fatty acid amide, a fatty acid alkylolamide, a fatty acid alkylolamide ester, a fatty amine, a fatty keton, an anhydride of a higher fatty acid, an alkyl phenol, a fatty ether, a fatty alcohol polyglycolether, an alkylphenolpolyglycolether or mixtures thereof. The granulizers are used in an polyglycolether or mixtures thereof. The granules are used in an amount of 2–40%, preferably 7–15%, calculated on the substance to be granulated.

British Pat. No. 1,346,082 discloses the production of a granular stabilizer for chlorine containing vinyl resins by mechanical stirring a finely divided, liquefiable, stabilizer material or mixture of finely divided stabilizer materials containing at least one liquefiable stabilizer material which liquefiable stabilizer material is solid at room temperature and has a melting point below 200° C., whereby the mechanical stirring is continued until the energy supply required for the continuation of the stirring and the value of the temperature increase suddenly increase due to the agglomeration of the stabilizer material to granules and the stirring is then discontinued. Metal soaps used are for instance lead stearate, dibasic lead stearate, barium stearate, barium laurate, calcium stearate, magnesium stearate, zinc stearate etc.

French Pat. No. 1,358,204 discloses the coating of a powdery lead compound which is to be used as a stabilizer with an amount of liquid plasticizer in which the amount of plasticizer should be so small that it is not detrimental to the mechanical properties of the resin to be stabilized. For this purpose a suspension of the powder is stirred with a solution of the liquid plasticizer in an organic carboxylic acid which yields a water insoluble salt with lead. The carboxylic acid used is a straight chain fatty acid of 6–22 carbon atoms or a cyclic carboxylic acid. The lead compound can be prepared by a precipitation reaction and the carboxylic acid solution in the plasticizer can be added immediately after the deposition. The amount of plasticizer is 0.5 to 8%, calculated on the weight of the powder and the amount of carboxylic acid is 0.1 to 2%, calculated on the weight of the powder.

The possibility to obtain granular lead stabilizers is important since this strongly counteracts the scattering of the powder of said stabilizers during the addition to a plastic and the risks involved with the use of powdery lead stabilizers with respect to their toxicity can thus be diminished and avoided, respectively.

The existing types of granules are made in accordance with conventional methods, as disclosed above, connected with disadvantages originating from the production or relating to the quality. Said products are many times not universally applicable in the rigid and soft PVC, processing industry due to their composition. The use of plasticizers is especially a great disadvantage for the industry manufactering rigid PVC. Further dust forming can occur during the transport from the producer to the user or even at the user, and for that reason the granules remain a toxic risk.

In an effort to solve these problems, a flake form of product is offered by one company, which also suggests a closed system to their customers. The flake form, while far less dusty for plant use than the powdered form, does break down and present some dusting problems. It also has to incorporate far greater quantities of lubricants and binders, which create problems in use and mitigate against a savings in amount needed.

Other companies supply powdered form additives to most of their customers, but also offer teflon coated and wetted material to control dust. In both cases, dustiness, while reduced, continues to be a problem in the plant atmosphere. In neither case does the customer obtain benefit as regards dispersibility, and therefore does not obtain a savings.

A closed system can be used as a means of controlling dust. However, the costs of such an installation can be quite high, and depending on the size of the extruding equipment, can be as much as $100,000 to $250,000. One advantage of the present invention is that it eliminates the need for a closed dust control system. However, even in cases there such a system is in place, the present invention is still of a great deal of interest because of the greater dispersibility it provides to the product, which itself effects economies.

Accordingly, a principal object of this invention is to provide a process and apparatus for obtaining substantially dust-free particles containing additives for use in the manufacture of plastics, and which practically eliminates all the above disadvantages, and in which all usual plastic additives can be processed.

A further object of this invention is to provide a process and apparatus in which, with a minimum addition of additional adjuvants, a product is obtained in which all usual plastic additives can be processed, by extruding the material through a thin perforated die having small diameter tapered openings therethrough, and which is in front supported by a perforated die support plate having larger openings than the openings in the die so as not to interfere with the flow of the product from the openings in the die.

Another object of the invention is to obtain a particulate blend of additives for use in manufacturing plastics, wherein the additives are extruded through a thin, perforated die having small diameter openings therethrough to obtain strand-like particles, the openings having a taper in the range of 1:5 to 1:15, and the die being supported by a perforated die support plate having openings therethrough larger than the openings through the die.

A further object is to provide a process and apparatus for obtaining strand-like, substantially dust-free particles containing additives for use in the manufacture of plastics, wherein a mixture of additives is extruded through a thin, perforated die having small diameter tapered openings therethrough, and wherein the mixture may include usual plastic additives without deleterious effects on the processing of the particles.

These and other objects and advantages of the invention are accomplished by a process and apparatus in which strand-like particles are produced.

The process for the production of the strand-like, substantially dust-free granular blend of a lead compound and one or more further additives for subsequent use in the manufacture of plastics, comprises the steps of mixing the additives together and extruding the mixture through a thin perforated die having small diameter tapered openings larger at their inlet, being supported in front of a perforated die support plate having larger openings than the openings in the die.

Apparatus suitable for the production of strand-like particles or granules containing one or more additives for use in manufacture of plastics, as above, comprises a housing having an inlet for material to be granulized and an outlet for the granulized material with a pelletizer between the inlet and the outlet. The pelletizer has an annular, perforated die with tapered openings of a first diameter therethrough, supported in front of an annular, perforated support plate engaged around and supporting the die and having openings of a second, larger diameter therethrough.

Said die support plate or die bed has openings of a different, larger diameter, more than 8 mm e.g., and expediently 10-15 mm. Roller means are spaced inwardly of the perforated die, and the die and roller means are rotable relative to one another to press the material through the perforated die and perforated die support plate to extrude the material in the form of strand-like particles.

The die of the invention has a thickness lesss than that of the die-support plate; the die may have a thickness of about 1–4 mm and the die support may have a thickness of about 10 to 50 mm.

In the process of the invention no plasticizer is needed. The product obtained exhibits a relative high stabilizing activity in polyvinyl chloride due to the high degree of dispersion of the stabilizers in the additives and its stability during storage is practically unlimited. In the present process it is possible to granulate one or more inorganic substances such as lead white, tribasic lead sulphate, lead phosphite or mixtures thereof, or also together with metal soaps, such as neutral or basic lead soaps, cadmium soaps, barium soaps, barium-cadmium soaps, alkaline and zinc soaps.

The present process makes it possible to bring the adjuvants used in the processing of the plastic, particularly stabilizers and fillers, however, also dye-stuffs, plasticizers etc., into uniform granules where by the lubricants, such as used in the plastic processing, are used as a dispersion medium for the components in the granules with a melting point above 65° C. The composition of the granulate can be adapted to substantially all technical exigences, condition therefore are the processing conditions, which are based on the method of granulating itself.

The most important technical progress for the plastic processing industry of the present process resides in the fact that this can use the same constant form of the granules of stabilizers and further adjuvants, which are notorious sources of dust if they are used in powder form, both in the production of soft and rigid PVC. Further the granulate of the invention is considerably more free of dust than the known forms and the activity of the stabilizers in the plastic is higher than that of the powdery products. Even on fracture substantially no dust-forming occurs in the present product. A big advantage is that the toxic risks (lead poisoning) are limited to a minimum.

If desired, it is possible to incorporate in the composition some percentages (up to about 5% by weight) of the plastic in which the use is intended. This addition of the plastic in the granulate, however, has little influence on the affinity of the granulate for the plastic or the dispersability thereof. When using a liquid plasticizer consideration is given in the choice of the further compositions (e.g., to their melting points).

The high degree of dispersion of the original powdery stabilizers in the additives is obtained in two steps.

In the first step a mixture is produced, which is deformed in the second step by extruding it according to the method described above through a thin perforated die mounted on the inner side of a die-bed. A thickness of 1 to 4 mm is suited for the die and 2 mm is used in many occasions.

Such a perforated die can be made in an annular shape and can be used in a usual pelletizer such as for instance is known from the cattle and animal fodder industry. Such usual apparatus is commercially obtainable. Such a device consists of a die in which one or more rolls are mounted, which rolls press the material through the die. In practising the present invention a further perforated die-plate is mounted in the usual die which than is serving as a die-bed. The openings of the die are tapered and smaller than the openings in the die-bed. As noted previously, pressing the material through an usual die-bed with openings of a diameter of, for instance 8 to 12 mm, yields a product with an insufficient strength or other insufficient properties. Conversely, the use of a die with conventional smaller openings, for instance, with openings of 1 to 2 mm in a plate of usual thickness also does not give satisfactory results.

Surprisingly, only the present invention, using a thin die with small tapered openings in conjunction with a die-bed having larger openings, gives good results. The perforated plate or die used according to the invention has openings of 0.5 to 4 mm, preferably 1 to 2 mm, and is preferably a hard chromed chromium-nickel plate. The openings in the perforated plate are broader at the side of the rolls than at the side of the die-bed or supporting plate. Thus, a smller energy supply is required.

A taper in the range of 1:5 to 1:15 is suitable, although a taper of 1:9 to 1:11, especially 1:10 is preferred, for instance.

A suited thickness of the wall of the supporting die-plate or die bed is 20 to 30 mm. This is less than usual for other dies typically used in the industry. Preferably, the openings in the supporting die-plate or die bed are also tapered (e.g. 1:10) and have the broader side outwards. This is in contrast with the usual construction.

Dependent on the product produced in the first step, the amount of mixture supplied to the device and the speed of revolutiions of the pelletizer and adjusted so as to prevent that the temperature of the granulate departing from the device reaches too high a level.

It is in general not advisable that the granules departing the device have a temperature of above 40° C. (as measured with a thermocouple mounted in the discharge outlet). The length at which the thread-like product breaks after leaving the die is determined by the composition, temperature, extrusion pressure, the speed of the revolutions and the distance between roll and die and thus can be influenced by the choice of said parameters. The product has a uniform diameter. The usual length is 5 to 10 mm, although deviations are possible.

The pressure applied to the supplied blend during the granulation causes a fractional improvement of the degree of dispersion of the stabilizers, which causes an increase of the activity of the stabilizers. It is beneficial to use a device in which the distance between the roll and the die is adjustable. Such adjustable devices are known, as such. In the use of such a device, it is possible to obtain a good product from a mediocre product, i.e., a product with only a small amount of plasticizers and lubricants, by placing the rolls at a greater distance to the die. With a higher amount of plasticizer and lubricant in the product, the roll can be placed closer to the die in order to obtain a good final product.

After pressing, the product is cooled to room temperature such that the shape obtained remains intact.

In this granulation method it is expedient to use a mixture in which the melting point of the lowest melting lubricant is above 40° C. However, more specifically a mixture is used containing no components of a melting point below 40° C., with the exception of the plasticizer. The melting point of the highest melting lubricant used is dependent on the limit given by the user and is in general not above 80° C. The average melting point of the lubricants which can be combined with one or more plasticizers, if desired, is preferably between 50° and 65° C.

The mixture that is converted into the granulate can be obtained by several mixing devices. It is expedient to use mixing devices fulfilling two important conditions, viz.:

(1) a relative high velocity of revolutions to obtain high shear forces onto the particles slept with the mixing device.

(2) a continuous good homogeneous blending of all the material.

Suited mixers for this purpose are for instance the so-called dissolvers with a propellor/toothed ring combination mixing device or a comparable mixing principle and rapid mixers of the Diosna brand and comparable devices.

For the production of the material suited for the granulator the constituents such as inorganic stabilizers, organic metal/alkaline metal/zinc soaps, fillers and optionally pigments, antistatica and/or further additives such as plasticizers for instance and the liquefiable additives, which can be premixed or not, are introduced into a mixer which need not to be heatable or coolable. The mixing device exercises forces onto the mixture which causes an increase of the temperature.

The composition of the material suited for the processing according to the above described granulation method, should fulfil an important exigence, apart from the limitations in the melting temperature, namely such a (low) percentage (4 to 15%) of liquefiable and/or liquid additives (dependent on the oil absorption number of the powdery components which do not melt below 110° C.) that the non-liquefiable stabilizers and/or metal soaps can be dispersed as an optimum in these additives and optional further additives such as plasticizers. During the dispersion heat is envolved which increases the temperature of the material. Said increase of temperature enhances the velocity and degree of dispersion, however, only until the moment that the material reaches the average melting point of the liquefiable additives (most times between 50° and 65° C.). When said melting point is passed a lump forming occurs and the material is not suited for the above mentioned granulation method. The desired speed of revolution of the mixing device is also determined by the composition of the desired granules. The powder adsorbed by the mixing device (Ampères) is the best perceptible measure for the determination of the moment (indirect the temperature) at which the dispergation should be stopped immediately and an optimum dispersion of the solid stabilizers in the additives is reached. When the average melting point of the additives is passed a spontaneous increase of the adsorbed power of the mixing device occurs and the starting absorption multiplicated by factor 2 is rapidly passed.

The warm semolinaous material with a rough distribution of the particle size of:

±85% <63 mu
±5%   63–200 mu
±10% >200 mu obtained according to this method having a bulk density of about two times the bulk density as before the dispersion phase is preferably cooled to room temperature before being granulated. For this purpose usual slow speed (ribbon) cooling mixers, cooling (screw) transporters or analoguous devices can be used.

Further, the above defined dispersing method gives the possibility to incorporate in the compositions of the material suited for the above mentioned granulation process, pigments, fillers and further powdery starting materials used in the PVC industry, whereby it is possible to incorporate in the granules more than 90% of the total of inorganic and insoluble organic lead compounds.

Suited not liquefiable stabilizers are inorganic/organic lead Ba/Ca salts.

Liquefiable additives which can be used are lubricants as usually are used in the plastic processing, most times with a long chain hydrocarbon radical, such as esters from fatty alcohols or synthetic alcohols and fatty acids etc. Further paraffines, montan waxes etc. are suited.

Further useful additives are the usual fillers such as calcium carbonate, pigments, uv absorbers and plasticizers such as expoxidized oils, phthalate plasticizers and phosphate plasticizers and antioxydantia fire retarding agents.

The cooling after the granulation can be in the air or in an expedient cooler. It is expecially preferred to use a helical cooler ("Wendelförderer"). After the cooling any fine particles can be sieved off, is desired, and said fine particles can be recycled to the granulation process. The strands obtained can be transported to a packing unit after the cooling.

Figure 1:
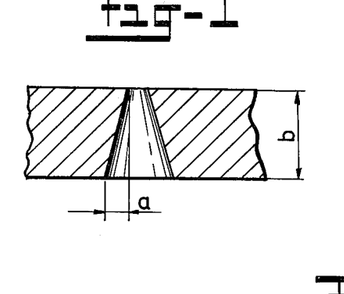

The taper of the die openings is defined as the ratio of the dimensions a to b as shown in FIG. 1. In FIG. 1, a is equal to one-half the difference in diameter of the openings at the inlet and outlet ends, respectively, and b is the thickness of the die plate.

Figure 2:
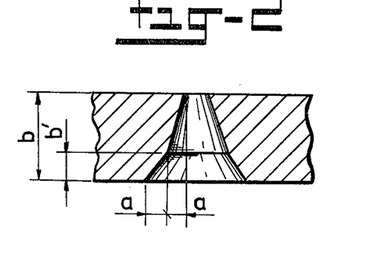

In one form of the invention, a compound taper may be employed, that is, different tapers may be employed for different sections of the opening. For example, as shown in FIG. 2, preferably, the taper is wider at the inlet end of the opening, as represented by the ratio of a' to b', while the taper of the opening through the outlet end is represented by the ratio of a to b. The numerical value assigned to a compound taper is the average of the sum of the individual dimensions. For example, the taper of the FIG. 2 embodiment would be calculated as $(a+a')/(b+b')$. Reference to the "taper" in the specification and claims thus includes the average taper in the case of compound tapers. Generally, in accordance with the invention, the die plate is thin in order to reduce the length of the extrusion opening and is tapered wider at the inlet than at the outlet, in order to facilitate the extrusion flow of material therethrough. The short length of the extrusion openings and their tapered configuration permit extrusion without requiring excessive forces and resultant high temperatures. Because of the thinness of the die and the forces required, it is necessary to support the die with a die support plate or die bed which also has openings in it, which are larger in diameter than the die openings and preferably tapered, but in a direction opposite to that in which the die are tapered, to facilitate the unhampered discharge of extruded material through the die support plate.

The invention is further illustrated by drawings 3–9 which are not on scale and wherein like reference characters designate like parts through the several views, and wherein.

Figure 3:
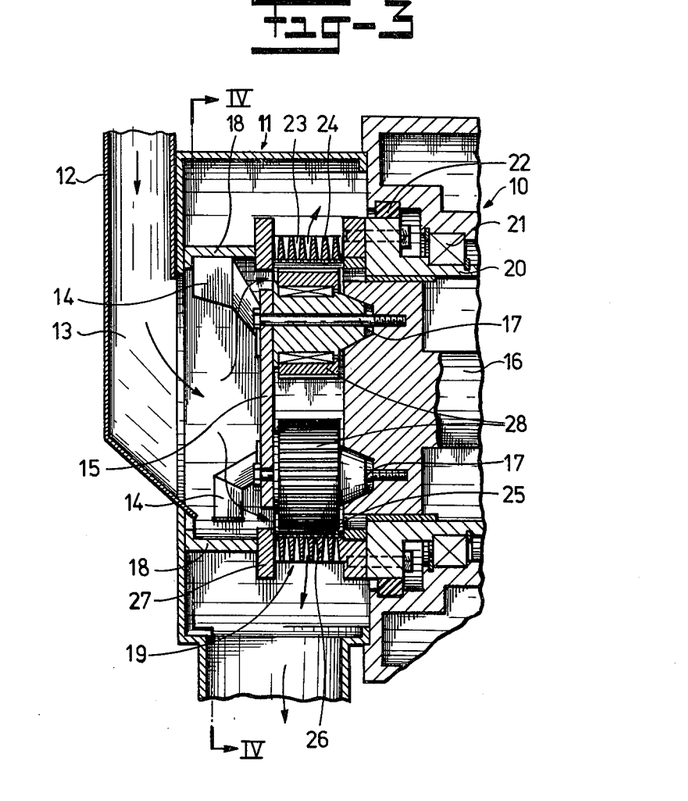
FIG. 3 is a fragmentary, sectional view of a portion of a pelletizer or granular according to the invention.
Figure 4:
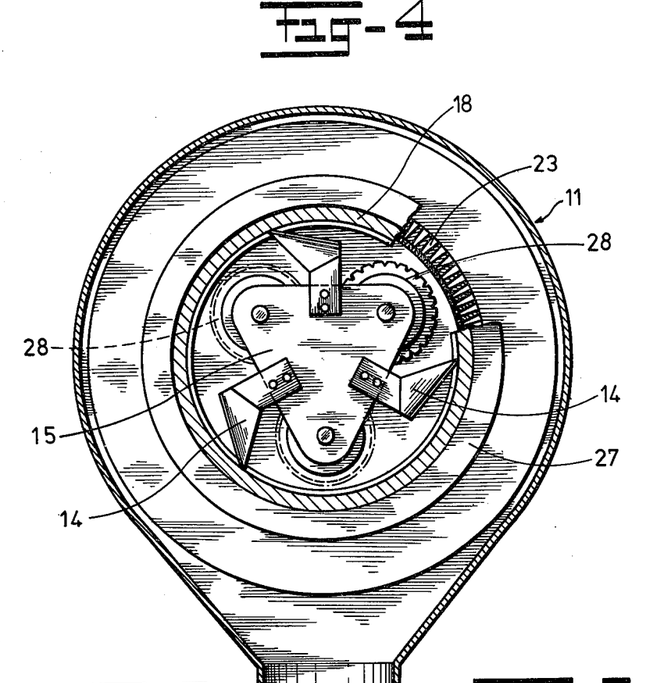
FIG. 4 is a vertical sectional view taken along line 4—4 in FIG. 3.
Figure 5:
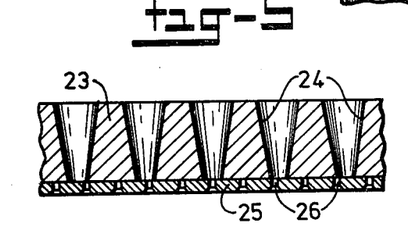
FIG. 5 is an enlarged, fragmentary sectional view of a portion of the die and supporting die plate of the pelletizer of the invention.
Figure 6:
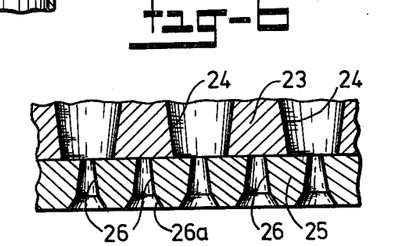
FIG. 6 is a further enlarged, fragmentary sectional view similar to FIG. 5.

In FIG. 3 the pelletizer according to the invention is represented generally at 10, and comprises a housing 11 havig a supply hopper 12 leading to a feed chamber 13 having fixed blades 14 therein, carried by a plate 15 fixed to a shaft 16 by a plurality of bolts 17. The shaft is suitably secured to the housing to prevent rotation thereof.

The feed chamber 13 is defined in part by cylindrical walls 18, carried by an annular matrix or die assembly 19, fixed to a cylindrical, rotatable shaft 20. The shaft 20 is driven by a suitable motor, not shown, and is supported in housing 11 by bearings 21 and seals 22.

The die assembly 19 comprises an annular, die supporting plate 23 having tapered openings 24 therethrough, larger toward the outer circumference of the plate, and an inner, annular die 25 secured against the inner surface of the plate 23. The die 25 has tapered openings 26 therethrough of smaller size than openings 24, and being larger toward the inner circumferential surface of the die. The openings 26 may include an entry portion 26a, for instance, of greater taper to further facilitate movement of the product into and through the openings. The die 25 is held or clamped in place by a clamping ring 27.

The die supporting plate or die bed 23 has a thickness on the order of from about 20 to 30 mm, and the openings 24 have a taper of about 1:10.

The die 25 is preferably made of a hard chromed chromium-nickel plate and has a thickness of about 1 to 4 mm, with openings 26 having a diameter of from about 0.5 to about 4.0 mm, and preferably about 1 to 2 mm. The openings 26 preferably have a taper of 1:10 although the taper may be from about 1:5 to about 1:15.

Figure 8:
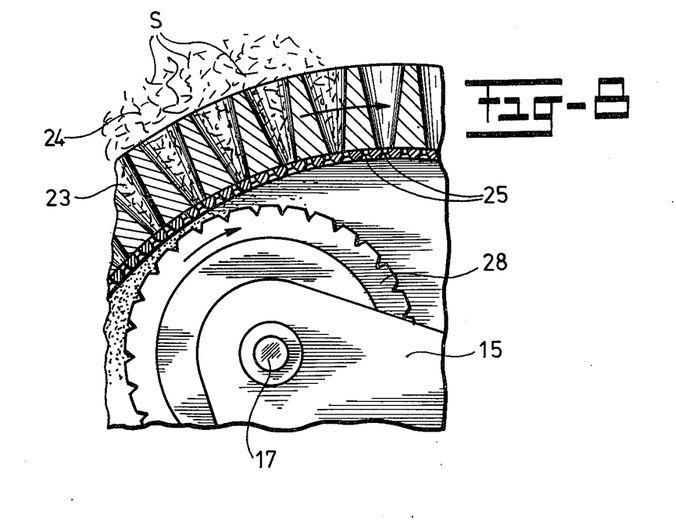
FIG. 8 is an enlarged, fragmentary sectional view of a portion of one of the rollers and the die and die supporting plate used in the pelletizer of the invention.

The die support plate 23 supports the die 25, and since the openings 24 are larger than the openings 26, the extruded strands S (FIG. 8) are removed immediately and do not undergo further resistance.

Figure 7:
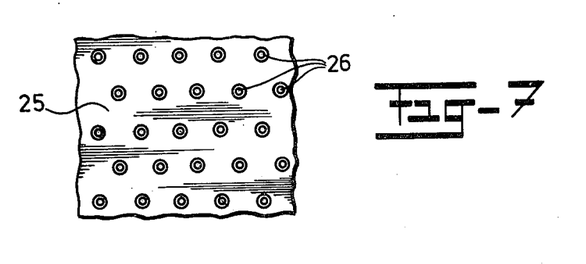
FIG. 7 is an enlarged, fragmentary plan view of the die.

The pattern of openings 26 as represented in FIG. 7 is illustrative only, and it should be understood that the openings could have other patterns or arrangements.

Figure 9:
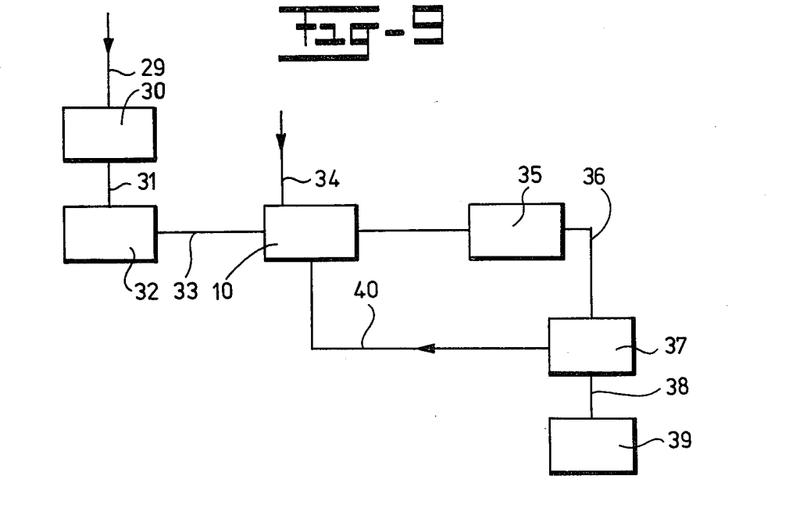
FIG. 9 is a schematic block diagram of a process according to the invention.

Rollers 28 are rotably mounted on the bolts 17 for cooperation with die 25 as the die rotates, to force material through the die openings 26 to extrude the strands S. The distance or spacing between the die 25 and rollers 28 is preferably adjustable. FIG. 9 gives a schematic block flow diagram of a preferred embodiments. Components are introduced via one or more conduits 29 to a premixer 30 and mixed. Via conduit 31, the product is transported to a density increaser 32, where the mixture is densified to e.g., two times the original density. From 32, the product is conveyed via a conduit 33 to pelletizer 10, in which it is possible to introduce further components via conduit 34, and the granules obtained after the pelletizing are received in a cooler 35, which may be a helical cooler, or other known construction may be used. The product obtained is conveyed via conduit 36 to sieve 37. The granules are transported from the sieve via conduit 38 to packing unit 39 and are packed and removed. The fine components are recirculated from sieve 37 via conduit 40 to pelletizer 10. According to another embodiment conduit 40 is connected with conduit 33 and the fine components are recirculated to conduit 33.

The premixer 30 and density increaser 32 may be of any suitable, commercially available construction, and the basic pelletizer may be a California Pellet Mill, model Century 75-21-E, modified to include the die and die plate of the present invention.

The invention is further illustrated by the following specific examples.

EXAMPLE I

In a Henschel mixer with a gross contents of 160 liters, provided with a motor of a speed of revolution of 1450/2900 rpm, the revolution speed of the mixing divice being 580/1160 rpm the following mixture is introduced.

|  | parts by wt | parts by wt |
| --- | --- | --- |
| stabilizer, 3-basic lead sulphate | 40.60 | |
| stabilizer, 2-basic lead phosphite | 19.23 | |
| stabilizer/lubricant, lead stearate 28% | 17.55 | |
| stabilizer/lubricant, calcium stearate | 10.25 | |
| | | 87.63 |
| (a) binding agent, stearic acid melting point 57° C. | 4.00 | |
| (b) binding agent, 12-hydroxy-stearic acid, melting point 75° C. | 4.53 | |
| (c) epoxydized soy oil, melting point 15° C. | 2.81 | |
| (d) anti-oxydant, melting point 60° C. | 1.03 | |
| | | 12.37 |
| | Total | 100.00 |

The not preheated mixer is started at the high rpm and the temperature increases rapidly, in about 15 minutes a temperature of about 50° C. is reached, whereby the substances (a), (c) and (d) are weak and/or molten.

The increase of the power consumption is such that it is necessary to switch to the lower rpm.

The substance (b) is now in the weakening traject and the power of the mixing device (tip-velocity) causes a local sufficient wetting with the pigment particles.

The power consumption increases further and at an increase of the power consumption the desired degreee of densification is reached and the amount of a homogeneous composition with a powdery/semolina structure of a temperature of about 70° C. is obtained.

After that said densification (decrease of volume of about 50%) is reached, the mixer is emptied into a sump-cooling mixer. (This cooling is to avoid any risk of lacking of the product during transport to the granulator).

The material was then pressed in a Henkton-press (pelletizer 10). The pressing die being used as an auxiliary die and in said die a perforated plate having perforations of a diameter of 1.1 mm with a stitch of 35 mm is mounted, which die works as the real die.

The extrusion is performed at a temperature in the weakening zone of the total of binding agents and viz. at 35° to 45° C.

The granules thus obtained were then cooled and sieved to obtain the ready product.

EXAMPLE II

Example I was repeated, but the helical cooler was not used as a product with the same good properties was obtained.

EXAMPLE III

This example was performed in the device described in example I whereby the following components were introduced into the mixer:

|  | parts by wt | parts by wt |
| --- | --- | --- |
| stabilizer, lead white | 85.55 | |
| stabilizer/lubricant, 2-basic lead stearate 51% | 4.66 | |
| | | 90.21 |
| (a) binding agent, dicarboxylic acid-ester melting point 43° C. | 4.66 | |
| (b) binding agent, montan acid-ester melting point 82° C. | 4.66 | |
| (c) anti-oxydant, diphylolpropane melting point 60° C. | 0.47 | |

-continued

|  | parts by wt | parts by wt |
| --- | --- | --- |
| | | 9.79 |
| | Total | 100.00 |

The mixture is first mixed at a lower rpm during 15 minutes until a temperature of 55° to 60° C. is reached. The components (a) and (c) are molten at said temperature and component (b) is in the weakening zone. The stabilizers are wetted by the mixture and are densified.

After said state of densification (volume decrease of about 50%) is reached the mixer is emptied directly in a sump-cooling mixer.

A form free from the dust is obtained by pressing the material. The material is pressed in the way described in example I.

The granules thus obtained are subsequently cooled and sieved and then ready for use.

EXAMPLE IV

This example III was repeated without using the helical cooler whereby also a good result was obtained.

EXAMPLE V

A mixture of the following composition:

|  | parts by wt | parts by wt |
| --- | --- | --- |
| stabilizer, 3-basic lead sulphate | 85,23 | |
| stabilizer/lubricant, lead stearate 28% | 3.55 | |
| | | 88.78 |
| (a) binding agent, dicarboxylic acid-ester melting point 43° C. | 2.13 | |
| (b) binding agent, stearic acid melting point 57° C. | 5.33 | |
| (c) binding agent, cetyl-stearyl alcohol 50/50 melting point 53° C. | 3.55 | |
| (d) anti-oxydant, octyl-phenol melting point 50° C. | 0.21 | |
| | | 11.22 |
| | Total | 100.00 | was brought into the device described in example I.

The mixture was first mixed at a low rpm during 15 minutes. The temperature increases rapidly and at a temperature of about 40° C. the densification/wetting process starts. The power consumption increases. At about 55° C. and an increase of power consumption of about 80% with respect to the power consumption in the start the end point is reached and the mixture exhibits the properties described in examples I to IV for the same stadium.

After that said densification state (decrease of volume of about 50%) has been reached the mixer is directly emptied in a sump cooling mixer.

Subsequently the dustfree form is obtained by extruding the material according to the method described in example I.

The granulate thus obtained is subsequently cooled and sieved and is then ready for use.

EXAMPLE VI

The process of example V was repeated, however, the sump-cooling mixer was not used. This also produced good results.

EXAMPLE VII

The following mixture

|  | parts by wt | parts by wt |
|---|---|---|
| stabilizer, 2-basic lead phtalate | 80.05 | |
| stabilizer/lubricant, lead stearate 28% | 6.57 | |
| | | 86.62 |
| (a) binding agent, stearic acid melting point 57° C. | 6.57 | |
| (b) binding agent cetyl-stearyl alcohol 50/50 melting point 53° C. | 6.57 | |
| (c) anti-oxydant, diphylol-propane melting point 60° C. | 0.24 | |
| | | 13.38 |
| | | 100.00 | is brought into the device described in example I. The mixture is first mixed at a low rpm during about 15 minutes whereby the temperature rapidly increases. At a temperature of 45° C. the densification/wetting process occurs. The power consumption increased. At a temperature of about 55° C. and an increase of power consumption of about 70% the final product is reached and the mixture exhibits the same properties as in example I to VI in the same stadium.

After that said densification state (decrease of volume of about 50%) is reached the mixer immediately emptied in a sump-cooling mixer.

The dustfree form is obtained by extruding the material according to the method described in example I. The granulate thus obtained is subsequently cooled and sieved and is then ready for use.

EXAMPLE VIII

Example VII was repeated on the understanding that no sump-cooling mixer and helical cooler were used. This also resulted in a mixture with the same good properties.

We claim:

1. A process for the production of a granular blend of additives for use in manufacturing plastics by mixing such additives and subsequently processing them into granules, which includes the steps of providing a quantity of additive material, providing a thin perforated die plate having tapered die openings which are larger in diameter at their inlet ends than at their outlet ends, providing at the outlet side of said die plate a perforated die support plate having openings of a larger diameter than the die openings, causing the additive material to be introduced into and extruded through the openings in the die plate and discharging the extruded material as strand-like granules through said support plate openings.

2. The process of claim 1, wherein said support plate openings are tapered, with the larger diameter end thereof being at the outlet side of said support plate openings.

3. The process of claim 2, in which said die openings have a diameter of about at least 8 mm.

4. The process of any one of claims 1, 2 or 3 wherein said die openings have a taper of from about 1:5 to 1:15.

5. The process of claim 4 when said die openings have a taper of 1:9 to 1:11.

6. The process of any one of claims 1, 2 or 3, which includes the steps of providing a plurality of rollers in a position to cooperate with the die plate, causing relative movement of the die and die support plates with respect to said rollers to press the additive material against the die plate to extrude the material through the die openings and thence discharge the extruded material through the die support plate openings; and adjusting the speed of said relative movement and the rate of introduction of the additive material into the die openings such that the temperature of the extruded material leaving the perforated die and die support plate is not above 40° C.

7. The process of claim 6, wherein said die and said die support plate are of annular construction, with said die support plate disposed exteriorly of said die, and said die and die support plate are relatively rotated with respect to said rollers.

8. The process of any one of claims 1, 2 or 3, wherein the granules produced have a length of from 5 to 10 mm.

9. The process of any one of claims 1, 2, 3, wherein one of the additives in the mixture is a plasticizer and, with the exception of the plasticizer, the melting point of the lowest melting point additive used in the mixture is above about 40° C.

10. The process of claim 8, wherein the average melting point of the additives in the mixture is in the range from 50° to 65° C.

11. Apparatus for the production of strand-like extruded granules containing one or more additives for use in the manufacture of plastics, comprising:
a housing having an inlet for material to be granulized and an outlet for the granulized material;
a perforated die supported within the housing and having die openings therethrough, and a perforated die support plate engaging and supporting the die at the outlet side thereof and having support plate openings therethrough which are of larger diameter than said die openings; and
roller means spaced from and adjacent to the perforated die, said roller means and die being mounted for movement relative to one another to press the material against the die to extrude it through the die openings thereof and discharge the resulting extruded granules through said die support plate openings.

12. The apparatus of claim 11, wherein:
the die openings have a taper in the range of from 1:5 to 1:15 the die openings being of larger diameter at the inlet ends than at the outlet ends thereof.

13. The apparatus of one of claims 11 or 12, wherein the die openings have a taper of 1:9 to 1:11.

14. The apparatus of one of claims 11 or 12, wherein the die openings have a compound taper in which an inlet section of the die opening has a larger taper than an outlet section of the die opening.

15. The apparatus of one of claims 11 or 12, wherein the die openings have a diameter in the range of from 1 to 2 mm.

16. The apparatus of claim 15, wherein the die has a thickness of about 2 mm and the die support plate has a thickness of about 20–30 mm.

17. The apparatus of any of claims 11 or 12, wherein the die has a thickness less than that of the die support plate.

18. The apparatus of claim 17, wherein the openings in the die and die support plate each have a taper of 1:9 to 1:11.

19. The apparatus of claim 17 wherein the die has a thickness of 1–4 mm and the die support plate has a thickness of 10 to 50 mm.

20. The apparatus of claim 17 wherein the die has a thickness of 1–4 mm and the die support plate has a thickness of 20–30 mm.

* * * * *

UNITED STATES PATENT AND TRADEMARK OFFICE
CERTIFICATE OF CORRECTION

PATENT NO. : 4,446,086

DATED : May 1, 1984

INVENTOR(S) : Maarten Molenaar and Hermann A. Schreuder

It is certified that error appears in the above-identified patent and that said Letters Patent are hereby corrected as shown below:

Col 1, line 38 delete "preferable" and substitute --preferably--

Col 2, line 14 delete "amound" and substitute --amount--

Col 3, line 56 delete "lesss" and substitute --less--

Col 4, line 51 delete "than" and substitute --then--

Col 4, line 54 delete "an" and substitute --a--

Col 6, lines 26 and 27 delete "powder adsorbed" and substitute
   --power absorbed--

Col 6, line 34 delete "adsorbed" and substitute --absorbed--

Col 7, line 2 delete "expecially" and substitute --especially--

Col 7, line 4 delete "is" and substitute --if--

Col 8, line 37 delete "embodiments" and substitute --embodiment--

Col 8, lines 66 and 67 delete "divice" and substitute --device--

Col 11, line 4 delete "phtalate" and substitute --phthalate--

UNITED STATES PATENT AND TRADEMARK OFFICE
CERTIFICATE OF CORRECTION

PATENT NO. : 4,446,086

DATED : May 1, 1984

INVENTOR(S) : Maarten Molenaar and Hermann A. Schreuder

It is certified that error appears in the above-identified patent and that said Letters Patent are hereby corrected as shown below:

Col. 1, line 25 delete "disclses" and substitute --discloses--

Col. 2, line 56 delete "there" and substitute --where--

Col 3, line 39 after "for use in" add --the--

Col 4, lines 33,34 delete "compositions" and substitute --components--

Col 5, line 12 delete "revolutiions" and substitute --revolutions--

Col 5, line 12 delete "and" and substitute --are--

Col 10, line 30 delete "85,23" and substitute --85.23--

Signed and Sealed this

Twenty-fifth Day of June 1985

[SEAL]

Attest:

DONALD J. QUIGG

Attesting Officer — Acting Commissioner of Patents and Trademarks